United States Patent Office 3,616,493
Patented Nov. 2, 1971

3,616,493
APPARATUS FOR COMPRESSION MOULDING POWDER MATERIAL WITHIN CONTAINERS
Kei Okubo, Neyagawa, Toru Horiguchi, Kadoma, Miyoji Nakai, Neyagawa, and Haruhisa Shimada, Osaka, Japan, assignors to Matsushita Electric Industrial Co., Ltd., Osaka, Japan
Filed Mar. 24, 1970, Ser. No. 22,339
Claims priority, application Japan, Mar. 31, 1969, 44/24,940
Int. Cl. B29c 3/02, 3/04, 3/06
U.S. Cl. 18—20 C                                    4 Claims

ABSTRACT OF THE DISCLOSURE

An apparatus for supplying powder material into a plurality of containers such as cans and compression moulding said powder material into a required shape at the same time within said plurality of containers, which apparatus comprising an intermittently rotated table formed at its periphery with a plurality of angularly equally spaced protruded portions and extending radially outwardly, container holding means provided in said each protruded portion of the table, and means for supplying said powder material into and subsequently compression moulding said powder material into a predetermined desired shape within said plurality of containers simultaneously, whereby the containers having therein moulded powder material of a required shape can be produced in large numbers during a single rotation of the table, said apparatus being suitable in particular for moulding anode depolarizer for the cell.

---

The present invention relates to an apparatus for supplying powder material into containers such as cans and thereafter compression moulding said material within said containers.

In more detail, the powder material moulding apparatus according to the present invention comprises an intermittently rotated table formed at its periphery with a plurality of, for example, four angularly equally spaced protruded portions extending radially outwardly, a plurality of, for example, eight container holding means provided in said each protruded portion of the table, means for rotating the table intermittently, means for feeding the containers to said container holding means in said protruded portion of the table, means for supplying powder material into said containers, and means for compression moulding said powder material within said containers.

The powder material moulding apparatus according to the present invention requires relatively lower mechanical strength than the conventional ones and has in addition thereto the advantage of being able to be constructed with compactness and simplicity, since in this apparatus powder material is supplied into a plurality of containers retained in container holding means formed in protruded portions of a rotary table by means of a pair of press moulding means and corresponding pair of powder supplying means, and powder material stuffed in the containers are compression moulded in two stages.

Prior to the present application, similar apparatus as described above have been proposed by the present applicant himself. However, the apparatus have proved to be not sufficiently suitable for mass-production purposes although they have proved to be able to be advantageously applied in various uses, for example, in stuffing the anode compound of an alkaline dry cell. The above disadvantage is based mainly upon the fact that in the previously proposed apparatus the containers had to be fed only one by one and accordingly the powder material stuffed within the container had also to be press-moulded one by one, which results in a great inefficiency.

Accordingly, one of the objects of the present invention is to provide an apparatus in which powder material such as particularly anode depolarizer for the cell can be compression moulded into a predetermined, desired shape within containers as of cell casings so that such containers having powder material moulded therein can be produced in large numbers during a single rotation of the table.

Another object of the present invention is to provide a means for continuously feeding a plurality of containers such as cell casings simultaneously to a container holding area provided in protruded portions of the rotary table so that the efficiency of feeding the containers may be increased remarkably.

Further object of the present invention is to provide an improved means for supplying powder material uniformly within ±2% error in weight and simultaneously into containers by applying rotational vibrations thereto.

Additional objects, features and advantages of the present invention will become apparent to those skilled in the art from the following detailed description and attached drawings on which, by way of example, only one preferred embodiment of the present invention is illustrated.

Figure 1:
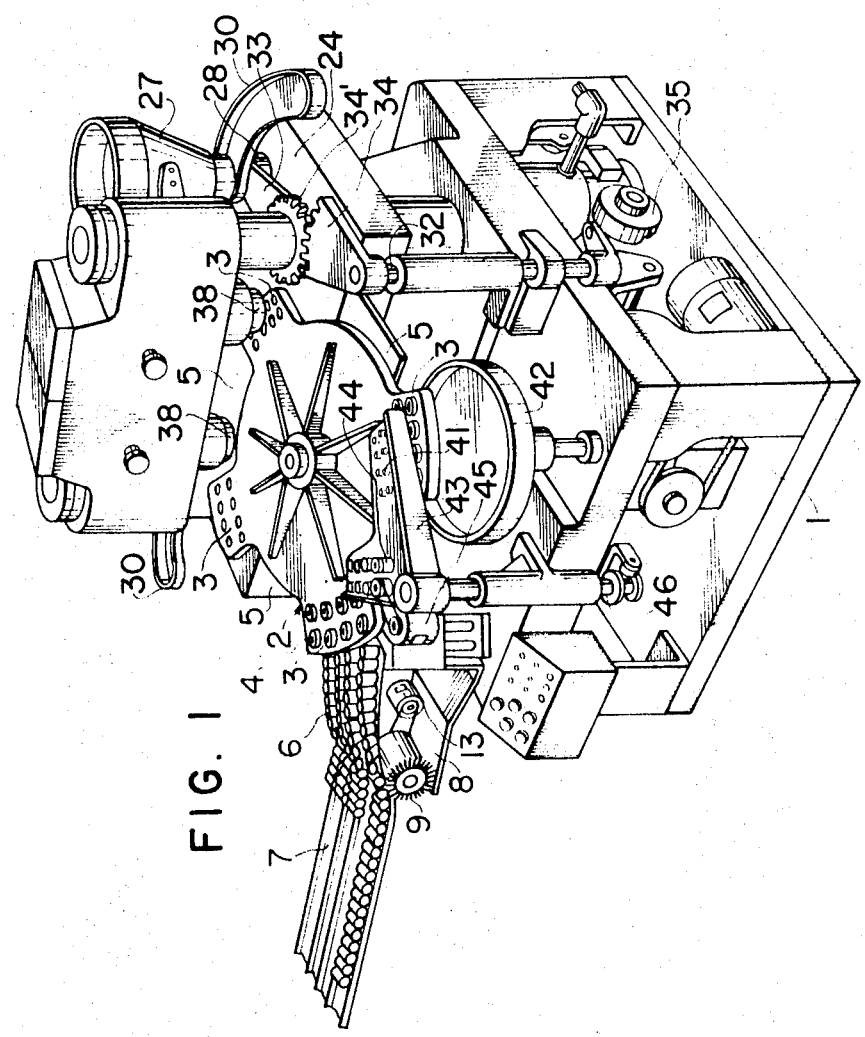
FIG. 1 is a perspective view of the multiple-stage powder stuffing apparatus illustrating one preferred embodiment of the present invention.

Referring to FIG. 1, frame members supporting the entire assembly of the present apparatus are shown at 1, and on the generally central portion thereof is pivotally mounted a table 2 which is adapted to be intermittently rotated clockwise in the drawing.

Figure 2:
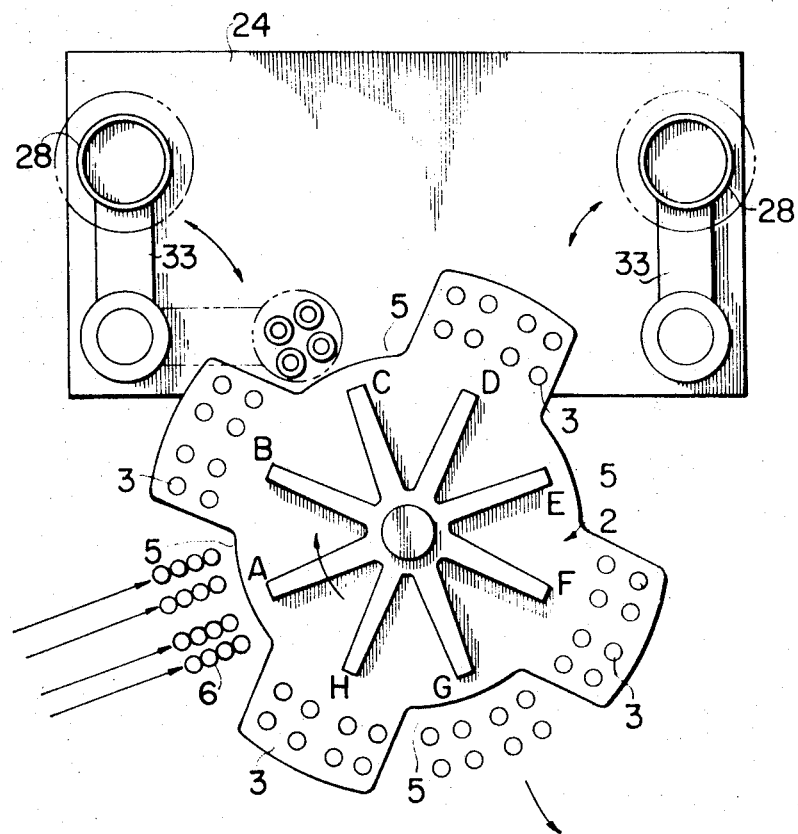
FIG. 2 is a plan view illustrating the cooperation between the rotary table and moulding means.

On the periphery of the table, four protruded lug portions are formed integrally with said table and angularly spaced with each other by 90 degrees, in said each lug portion eight dies for retaining containers being symmetrically provided in two rows and equally spaced from each other, as best shown in FIG. 2.

The rotary table 2 is adapted to be intermittently rotated 45° by 45° in the clockwise direction and, therefore, when the table is rotated by one step, i.e., by 45 degrees, the lug portion 3 of the table comes to the position where the recessed portion formed between each two lug portions of the table located till then.

Accordingly, the table 2 has eight stop or operation positions in sum, and the eight stop positions are contemplated to be shown at A through H in turn clockwise, as shown in FIG. 2.

There are fed, at first, containers 6 forming the casings of the cell to the dies 4 provided in the lug portion at the position of A. The containers 6 are fed by way of four downwardly inclined, parallel passages or chutes 7, lying on their sides and with their axes perpendicular to the length of the chute 7, and they are forced their ways toward right in FIG. 1 by means of a rotary brush 9 disposed on a support plate 8 extending laterally from one side of the frame 1, said rotary brush 9 being rotated clockwise in FIG. 1 by a proper device such as electric motor shown at 13. The containers are gradually erected upright, with their bottoms up, along their way on the section of the chute 7 distorted suitably for this purpose, and are rested upon a carrier plate 11 disposed below the lug portion 3 of the position A, abutting against a stopper 12, as well shown in FIG. 3.

Figure 3:
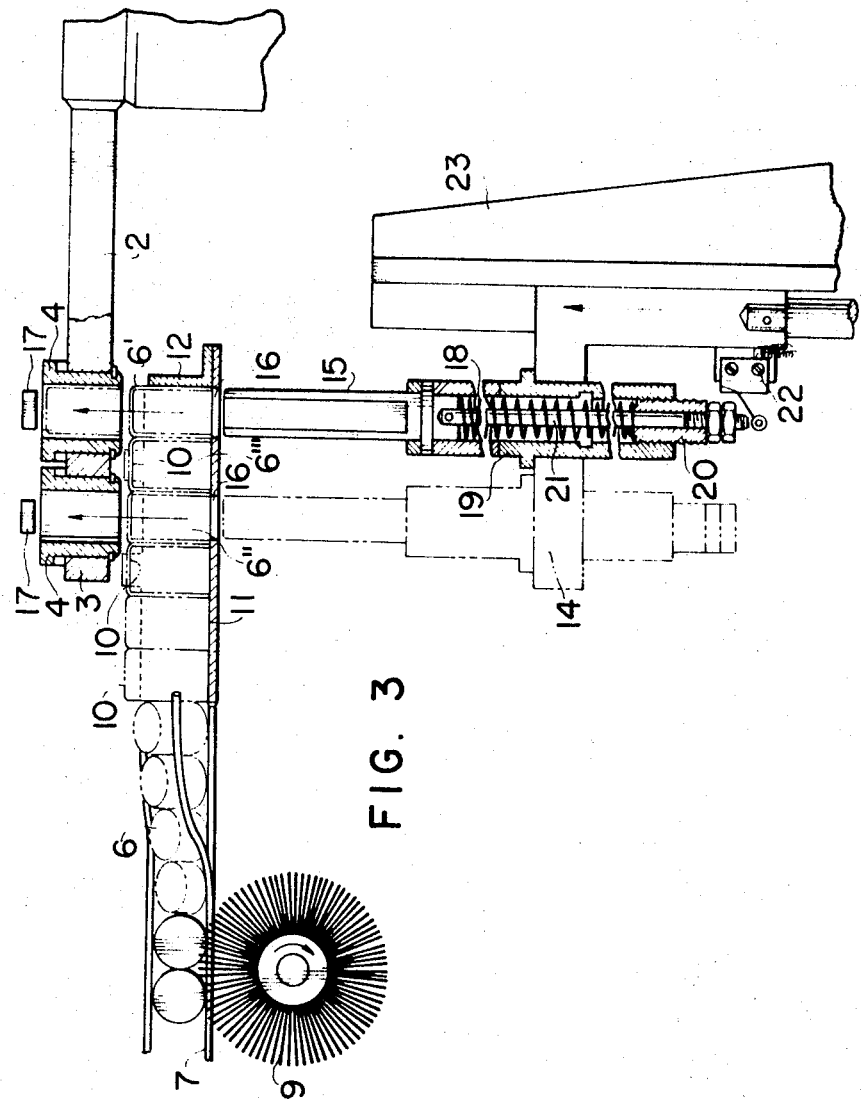
FIG. 3 is a partially cut-away side view of the means for feeding the containers to the rotary table.

The forward-most container 6' of the containers 6 thus sent on to the carrier plate 11 by way of the chute 7 is held at rest abutting against the stopper 12 and all the containers on the plate 11 are located in contact with each other at their peripheries, as shown in FIG. 3. The first container 6' and the third container 6'' of the containers on the plate 11 are then pushed upwards by eight push rods 15 of a slide member 14 disposed right below the carrier plate 11 and inserted into each corresponding dies 4 with their bottoms up and therefore with their openings down.

The manner of inserting the containers on the carrier plate 11 into the dies 4 will be hereinafter described in more detail with reference to the attached drawings.

The push rods 15 are provided in the slide member 14 in two rows, each row having four push rods equally spaced from each other. The entire geometrical disposition of the eight push rods are just the same as that of the eight dies 4. The distance between each two dies 4 is equal to the outer diameter of the container 6 so that when the slide member are moved upward the push rods 15 push the bottom of the first and the third containers 6' and 6'' through apertures 16 provided in said carrier plate 11 and insert them into each corresponding dies 4. The diameter of said aperture 16 is naturally smaller than that of the container 6. Magnets 17 are provided over dies 4 of only the position A and fixed to the frame work 1 so that the containers 6' and 6'' may be prevented from falling downward through the dies.

The second container 6''' however remains on the carrier plate 11 after the first and the second containers were lifted above by the push rods 15. But, as the following containers are forced forward at all times by the brush 9, the third container 6''' is thereafter pushed against the stopper 12. Thus, it is replaced to the position where the first container 6' was previously located and then the first and the third containers are pushed upwards by the push rods 15 just in the same manner as described above.

In FIG. 3, there is shown a coil spring at 18 having tendency to urge the push rods 15, which is mounted slidable along the inside wall of a cylindrical sleeve 19, and seated at its lower end upon the annular groove formed around the periphery of the upper end portion of a cylindrical support member 20. In the support member 20 is slidably mounted a guide shaft 21, the upper portion of which guide shaft being fixedly inserted into the lower end portion of the push rod 15. In order to assure the correct and exact operation of the push rod, there is provided a safety device or microswitch 22 which always keeps contact with the lowermost part of the shaft 21. When the push rod 15 is prevented from upward movement by some causes, the microswitch is operated such that the entire operation of the apparatus is intermitted to stop without delay the movement of the push rod. In FIG. 3, there is shown a guide member 23, which is adapted to guide the slide member 14 along its vertical wall during upward and downward movement of the member 14. The slide member 14 is mounted for moving upward and downward by means of suitable cam means (not shown) disposed upon the frame work 1.

After eight containers have been inserted into the same number of retainer dies 4 provided in the lug portion located at A, the table 2 is then rotated intermittently 45° by 45° to the positions B, C, . . . , H, seriatim. When the table is rotated by 45° and located at the position C, the lug portion having containers inserted into its eight retainer dies comes above a moulding plate or platform 24 mounted rigidly on the frame work 1 in the manner that the four dies 4 located in the rear half in the sense of direction of the rotation of the table, i.e., located in the right half of the eight dies as shown in FIG. 2 are exactly aligned with four moulding dies 25 provided in said moulding platform 24.

Figure 4:
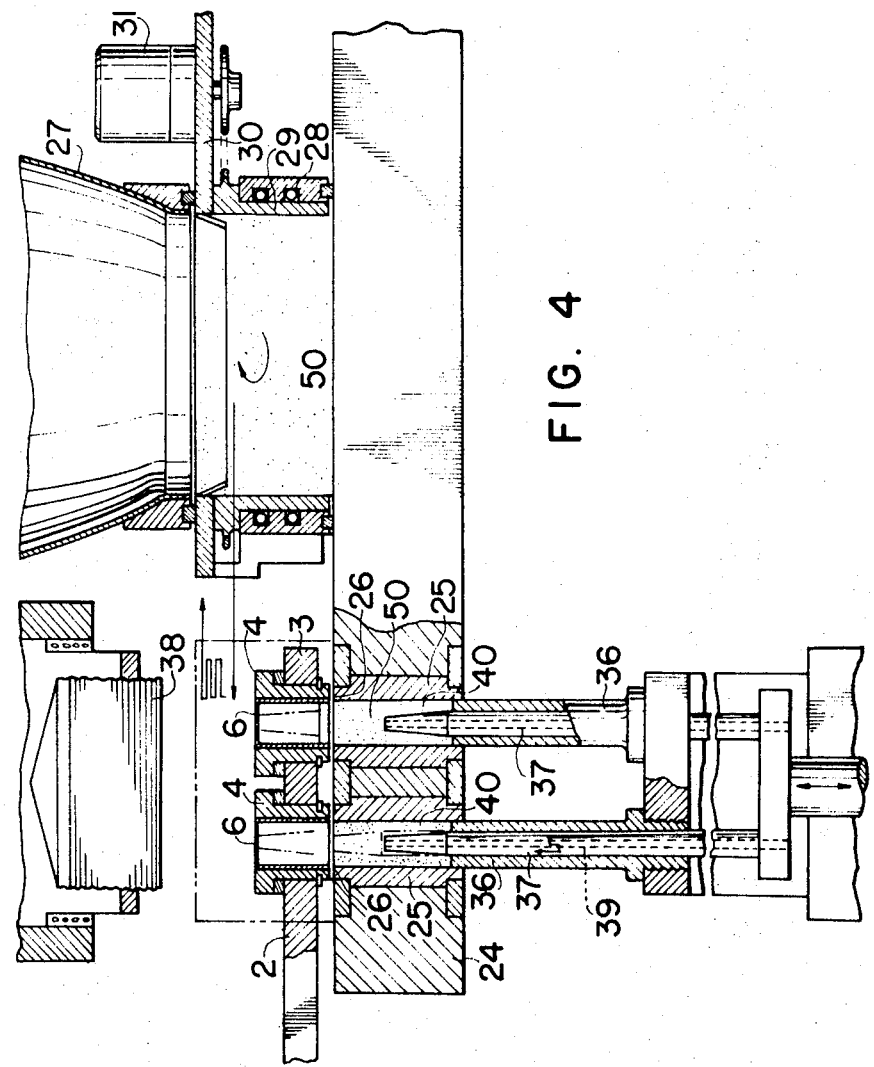
FIG. 4 is a sectional view of a cell casing retained in the rotary table, in which powder material was stuffed and compression moulded.

Before the lug portion having containers inserted into its eight retainer dies comes above the moulding platform 24 in other words while a recessed portion 5 is located over the four moulding dies 25 of the moulding platform 24, a proper amount of powder material or anode depolarizer 50 is supplied from a powder material reservoir or main hopper 27 rigidly mounted on the moulding platform 24 to a carrier hopper 28. The inner cylindrical sleeve 29 of the hopper 28 is mounted therein for rotating in the direction of the arrow shown in FIG. 4 by means of an electric drive motor 31 mounted rigidly with an arcuate base plate 30 formed integral with said carrier hopper 28, so that the powder material or anode depolarizer 50 can be charged into the hopper 28 in full and completely. Thereafter, an arm 33 having the carrier hopper 28 fixedly provided at its one end is swung 90 degrees in the clockwise direction by means of a sector gear 34 rigidly connected to a cam rod 32 and a gear 34' associated with said sector gear 34 and fixedly connected with the arm 33. Resultantly, the carrier hopper 28 disposed on one end of the arm 33 is swung to the position covering all the said four moulding dies 25. The cam rod 32 is subjected to minute, horizontal vibrations by means of a cam 35 disposed suitably at one side of the frame work 1 while the hopper 28 is located over the dies 25, so that the vibrations may be transmitted to the hopper 28 via the arm 33 whereby powder material or anode depolarizer 50 is effectively dropped into the four moulding dies 25. During the above operation, each top of punch rods 36 is aligned with the moulding dies 25 at the under surface of the moulding platform 24 and close the lower openings of the dies 25 so that the powder material falling from above may be received exactly within the internal space of the die. After this, each moulding spindle 37 mounted slidably in and along the internal bore of the punch rod 36 is lifted upward together with minute, vertical vibrations produced by a cam 51 and lifted at the end of power material supplying process to the level of the upper surface of the moulding platform 24, so that powder material can be charged in the four mouldng dies 25 uniformly and efficiently.

Figure 5:
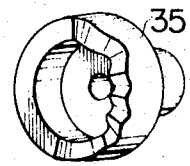
FIG. 5 is a prespective view of the cam which is adapted to generate minute vibrations to the main hopper of the present apparatus.
Figure 6:
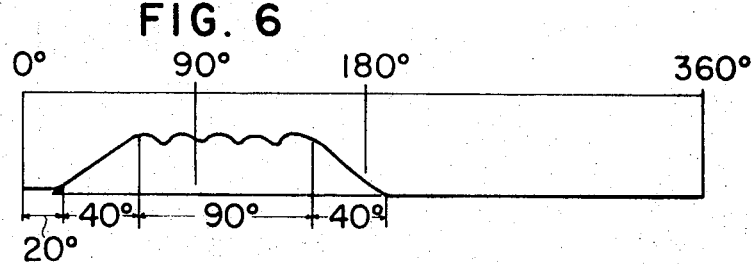
FIG. 6 is a cam diagram of the cam shown in FIG. 5.

The aforementioned cam 35 adapted for providing minute vibrations to the cam rod 32 is pictorically illustrated in FIG. 5, and as apparent from the figure is of a cylindrical sleeve type having a cam diagram as shown in FIG. 6. It is manufactured as having a corrugated profile so that it can provide minute, horizontal vibrations to the carrier hopper 28, thereby to charge powder material efficiently into the moulding dies 25 when the hopper 28 is swung by the arm 33 and comes to the position over said four moulding dies.

Figure 7:
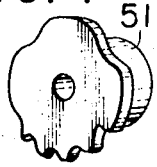
FIG. 7 is also a perspective view illustrating the cam for generating vertical vibrations to be transmitted to the moulding spindle of the moulding press apparatus.
Figure 8:
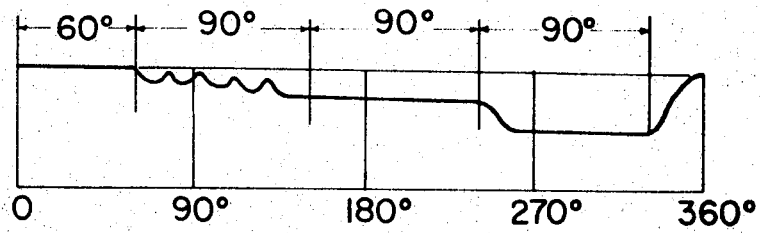
FIG. 8 is a cam diagram of the cam shown in FIG. 7.

Similarly, the cam 51 adapted for providing minute, vertical vibrations to the moulding spindles 37 is of a planar type having corrugations around its periphery as shown in FIG. 7, and has a cam profile shown by a cam diagram of FIG. 8. This cam is contemplated to provide minute, vertical vibrations as described above to the spindles 37 for the purpose that the powder material or anode depolarizer 50 may be charged into said four moulding dies 25 efficiently in a short while and in addition uniformly therein.

When the charge of powder material 50 into the moulding dies 25 is completed in the manner as above described, the carrier hopper 28 is restored to its original position, maintaining contact with the upper surface of the moulding platform 24 lest the remaining powder material should slip out of the hopper 28.

The arcuate base plate 30 is engaged with the lower opening of the main hopper 27 all the while the hopper 28 is located over the moulding dies 25. Accordingly, powder material is prevented from falling from the hopper 27.

After powder material was beforehand charged into the four moulding dies 25, the table 2 is rotated and the four dies in the rear half of the eight dies 4 retaining containers respectively come align with the four moulding dies 25 as described hereinbefore. When the containers 6 retained in each dies 4 are stopped at the position where they exactly align with the corresponding four moulding dies 25, a press member 38 disposed above the four moulding dies 25 is moved downward for closing the upper openings of the dies 25 and at the same time acting against the upper surface of the retainer dies 4. Thereafter, the moulding punch rods 36 adapted to slide within each moulding dies 25 are lifted by a suitable oil cylinder means (not shown) to the level where they abut to the periphery of the opening of the container 6, whereby the powder material 50 in the dies 25 is replaced into the containers 6.

At the same time, the moulding spindles 37 mounted vertically slidable in the punch rods 36 and having an exhaust bore 39 centrally thereof are lifted upright to the extent that each tips of the spindles 37 abuts against the bottom 10 of the container, whereupon the powder material is compression moulded within the container, with the air being discharged from said exhaust bore 39.

The powder material supplying means consisting of means 27, 28, 29, 30, 31 etc. and the moulding press means consisting of means 25, 36, 37, 38, etc. respectively, are provided as shown in FIG. 1, on opposite sides of the moulding platform 24, i.e., one on each side thereof.

Being arranged as above, when powder material is being charged into the four dies 25 on the left by means of the left powder material supplying means, the other four moulding dies 25 on the right are covered by the adjacent protruded lug portion 3 and therefore cannot be charged with powder material. However, when the following lug portion 3 comes above the four moulding dies 25 on the lefthand side of the moulding platform 24, the opposite four moulding dies 25 on the right-hand side of the moulding platform 24 are ready for the charge of powder material by the other powder material supplying means on the right, since the four moulding dies 25 on the right-hand side of the moulding platform 24 are then located between two lug portions 3. That is, the dies 25 on the left is angularly by 45 degrees spaced from the dies 25 on the right, viewed from the center of the rotary table 2. The procedure of charging the powder material 50 into the four dies 25 on the right-hand side of the moulding platform 24 is just the same as that taken with respect to the dies 25 on the left, except for the fact that the hopper 28 mounted on the arm 33 is swung by 90 degrees counterclockwise on the contrary.

When the table 2 is rotated from the position C to the position D after the charge of powder material into said four rear containers 6 is completed at the left side of the moulding platform 24, the powder material is charged into the four empty containers 6 retained by the four dies 4 located in the front half by means of powder material supplying means disposed on the right, and is compression moulded within the containers 6 by means of the press moulding means disposed also on the right-hand side of the moulding platform 24, just in the same manner as described with respect to the four containers on the rear half.

Thus, by supplying powder material 50 into the four forward containers and the four rearward containers 6 separately in two stages and at a certain interval, powder material is charged into each of the containers uniformly to a considerable extent and, in addition, in moulding the powder material within the containers, a relatively low moulding pressure is sufficient to achieve the operation. According to the above feature, it is possible to construct the entire apparatus with a relatively low mechanical strength.

In case that it is necessary to charge powder material or anode depolarizer 50 to be moulded into all the eight containers simultaneously, it is difficult to charge the powder material uniformly into the containers. Further, it is required to apply a considerably high moulding pressure for moulding the powder material in the containers; in case of this apparatus approximately 12 tons of moulding pressure being required for one container and therefore some 100 tons of moulding pressure being required in sum. Thus, it has the disadvantage that the apparatus must be constructed with an extremely high mechanical strength capable of standing a high load or pressure as above mentioned, and with unusually large and complicated mechanism.

After the charge of powder material 50 into the containers and subsequent compression moulding of said material within the containers are completed in two stages respectively at the position C and the position D, the rotary table 2 is then rotated in the clockwise direction to the position G through the positions E and F, at said position G all the eight containers 6 being dropped into a suitable receptacle 42 by means of discharge punch device 41 disposed upwardly of said receptacle as shown in FIG. 1.

These discharge punches 41 are disposed in one extention of a substantially V-shaped slide member 43 in two rows, each said row including four punches, and therefore the number of the discharge punches 41 is eight in sum in accordance with the number and the disposition of the retainer dies 4. In the other extention of said V-shaped slide member 43, there are provided also in two rows eight cleaner brushes 44 which may be driven for rotation by some suitable means such as electric motor 45.

The slide member 43 is disposed on the top of a shaft 46 capable of sliding vertically in cooperation with a suitable cam means provided on the frame 1, so that, when the table 2 is rotated to the position H after the containers are dropped out of the dies 4 by the downward movement of the shaft 46, said brushes 44 can be introduced into the empty retainer dies 4 to clean the inner surfaces thereof for the next tact of operation beginning from the position A.

Although the operation of the present invention during one full cycle of the rotary table 2 has been described heretofore by way of one preferred embodiment in which there are provided a pair of powder material supplying means and a pair of press moulding means, it is to be noted that the present invention can also be embodied in other several ways where there are provided in the apparatus three or more powder material supplying means and press moulding means, respectively. Such apparatus has the advantage that the mechanical strength and the moulding pressure required are both very low since the moulding pressure can be distributed to the same number of places as the number of the press moulding means provided. In such apparatus in which three or more powder material supplying means and press moulding means are provided, it is important to dispose them symmetrically in order to avoid the unbalance of the loads exerted to the apparatus.

As apparent from the description heretofore made, the present powder material moulding apparatus according to the invention has the advantages over the conventional apparatus of the type such as, for example, high efficiency suited for mass production, simpleness of the construction and relatively low mechanical strength required.

Although the present invention has been described with respect to specific details of one preferred embodiment thereof, it is not intended that such details be limitations on the present invention except insofar as set forth in the following claims.

We claim:

1. An apparatus for moulding powder material within containers, which apparatus comprising;

a rotary table adapted to be intermittently rotated and having a plurality of protruded lug portions provided angularly equally spaced from each other on the periphery of said rotary table, a plurality of container retaining means being provided in each of said plurality of protruded lug portions;

moulding platform means provided with a plurality of moulding dies in such positions that said moulding dies may be aligned with said plurality of container retaining means at more than two stop positions of said lug portions;

means for supplying powder material into said plurality of moulding dies provided in the moulding platform means;

moulding press means for charging the powder material within the moulding dies to the containers retained in said retaining dies of the table and subsequently compression moulding the powder material within the containers;

characterized in that there is provided two or more powder material supplying means and moulding press means respectively, and that said rotary table is rotated intermittently at the rate of an angular displacement equal to half of the angle formed by adjacent two protruded lug positions, so that, when powder material is being compression moulded within the containers at, at least, one position where a group of moulding dies are located, powder material can be supplied into the moulding dies at the other position or positions where the other group or groups of moulding dies are located.

2. An apparatus for moulding powder material within containers according to claim 1, characterized by comprising container retaining means in a plurality of rows and lines in each protruded lug portions of the rotary table, chute means for supplying containers, one end of said chute means being located under one stop position of the rotary table, container lifting means including a plurality of push rods disposed under said one end of the chute means and being subjected to a constant bias force of resilient means having tendency to urge said rod upward, the distance between each two rods being more than twice the diameter of the container, safety device for checking the normal operation of said push rods and slide means adapted for vertical movement.

3. An apparatus for moulding powder material within containers according to claim 1, characterized in that said powder material supplying means is comprised of powder material carrier hopper means secured to a portion of a slidable arcuate base plate and main hopper means fixedly mounted on the main body of the apparatus, and in that, after said arcuate base plate was slidingly moved over the moulding platform such that the carrier hopper means may be located over said plurality of moulding dies, horizontal and rotational vibrations are applied to said carrier hopper in order to supply powder material swiftly and uniformly into said plurality of moulding dies.

4. An apparatus as claimed in claim 3, characterized in that said press moulding means comprises a plurality of punch rods, each punch rod being provided with a spindle adapted to be lifted with vertical vibrations so that powder material may be supplied into said moulding dies swiftly and uniformly.

References Cited
UNITED STATES PATENTS

| | | | |
|---|---|---|---|
| 2,218,456 | 10/1940 | Soubier et al. | 18—5 RR |
| 2,483,028 | 9/1949 | Waldinger | 18—20 C X |
| 2,798,255 | 7/1957 | Winters | 18—20 C |
| 3,052,919 | 9/1962 | Rayburn | 18—16 F |
| 3,382,533 | 5/1968 | Fyfe et al. | 18—20 P X |
| 3,475,786 | 11/1969 | Pearson | 18—20 P X |

ROBERT L. SPICER, Jr., Primary Examiner

U.S. Cl. X.R.

18—20 P

UNITED STATES PATENT OFFICE
CERTIFICATE OF CORRECTION

Patent No. 3,616,493    Dated November 2, 1971

Inventor(s) Keo OKUBO et al

It is certified that error appears in the above-identified patent and that said Letters Patent are hereby corrected as shown below:

The Claim for Convention Priority should list additionally two other Japanese applications as follows:

--24941/69 filed March 31, 1969 and 24942/69 filed March 31, 1969--.

Signed and sealed this 2nd day of May 1972.

(SEAL)
Attest:

EDWARD M. FLETCHER, JR.        ROBERT GOTTSCHALK
Attesting Officer              Commissioner of Patents